(12) United States Patent
Nuti

(10) Patent No.: US 11,037,243 B2
(45) Date of Patent: *Jun. 15, 2021

(54) DYNAMIC DISSEMINATION OF INFORMATION TO NETWORK DEVICES

(71) Applicant: UBS Business Solutions AG, Zurich (CH)

(72) Inventor: Giuseppe Nuti, Larchmont, NY (US)

(73) Assignee: UBS Business Solutions AG, Zurich (CH)

(*) Notice: Subject to any disclaimer, the term of this patent is extended or adjusted under 35 U.S.C. 154(b) by 62 days.

This patent is subject to a terminal disclaimer.

(21) Appl. No.: 16/249,567

(22) Filed: Jan. 16, 2019

(65) Prior Publication Data

US 2019/0333148 A1 Oct. 31, 2019

Related U.S. Application Data

(63) Continuation of application No. 15/962,013, filed on Apr. 25, 2018.

(51) Int. Cl.
*G06Q 40/04* (2012.01)
*G06Q 10/06* (2012.01)
(Continued)

(52) U.S. Cl.
CPC ....... *G06Q 40/04* (2013.01); *G06Q 10/06312* (2013.01); *G06Q 30/0206* (2013.01); *G06Q 30/08* (2013.01); *H04L 47/15* (2013.01)

(58) Field of Classification Search
None
See application file for complete search history.

(56) References Cited

U.S. PATENT DOCUMENTS 8,612,323 B1 12/2013 Frait et al.
2005/0228741 A1* 10/2005 Leibowitz .............. G06Q 40/04
705/37
(Continued)

FOREIGN PATENT DOCUMENTS

WO 2010/085746 7/2010

OTHER PUBLICATIONS

Goldstein, "Putting a Speed Limit on the Stock Market," Oct. 8, 2013, The New York Times (Year: 2013).*

(Continued)

*Primary Examiner* — Ivan R Goldberg

(57) ABSTRACT

Information may be dynamically disseminated to network devices. In some embodiments, a data structure may be populated with first-type values and second-type values, a first delay time may be assigned to a first value of the first-type values based on the first value being associated with a first priority and a second delay time may be assigned to a second value of the first-type values based on the second value being associated with a second priority, and data structure information may be obtained from the data structure. The data structure information may be delivered such that the delivery of the data structure information to a first network device associated with the first value reflects the first delay time and the delivery of the data structure information to a second network device associated with the second value reflects the second delay time.

24 Claims, 9 Drawing Sheets

(51) Int. Cl.
*G06Q 30/02* (2012.01)
*G06Q 30/08* (2012.01)
*H04L 12/801* (2013.01)

(56) References Cited

U.S. PATENT DOCUMENTS

| | | |
|---|---|---|
| 2005/0262005 A1 | 11/2005 | Woolston |
| 2007/0100733 A1 | 5/2007 | Huizing et al. |
| 2008/0243675 A1 | 10/2008 | Parsons et al. |
| 2013/0212001 A1 | 8/2013 | Duquette et al. |
| 2013/0282549 A1 | 10/2013 | Howorka |
| 2013/0297478 A1* | 11/2013 | Mannix ............... G06Q 40/04 705/37 |
| 2013/0304626 A1* | 11/2013 | Aisen ............... H04L 43/0852 705/37 |
| 2014/0164202 A1* | 6/2014 | Singer ............... G06Q 40/04 705/37 |
| 2015/0066727 A1* | 3/2015 | Wepsic ............... G06Q 40/04 705/37 |
| 2015/0073967 A1* | 3/2015 | Katsuyama ........... G06Q 40/04 705/37 |
| 2015/0134533 A1 | 5/2015 | Melton |
| 2015/0356679 A1* | 12/2015 | Schmitt ............... G06Q 40/04 705/37 |
| 2016/0078538 A1* | 3/2016 | Katsuyama ........... G06Q 40/04 705/37 |
| 2016/0104242 A1* | 4/2016 | Melton ............... G06Q 40/04 705/37 |
| 2016/0205174 A1* | 7/2016 | Pitio ............... H04L 67/10 709/201 |
| 2017/0236202 A1 | 8/2017 | Melton |
| 2017/0372421 A1 | 12/2017 | Melton |
| 2018/0176320 A1 | 6/2018 | Soni et al. |

OTHER PUBLICATIONS

Extended Search Report issued in corresponding European Patent Application No. 19169219.3, dated Aug. 9, 2019.
U.S. Patent and Trademark Office Non-Final Rejection dated Jun. 12, 2019 in parent U.S. Appl. No. 15/962,013.
U.S. Patent and Trademark Office Final Rejection dated Jan. 17, 2020 in parent U.S. Appl. No. 15/962,013.
U.S. Patent and Trademark Office Non-Final Office Action dated Jan. 22, 2021 in parent U.S. Appl. No. 15/962,013 [Superseded by Jan. 26, 2021 Non-Final Office Action].
U.S. Patent and Trademark Office Letter Restarting Period for Response to Non-Final Office Action dated Jan. 26, 2021 in parent U.S. Appl. No. 15/962,013.

* cited by examiner

DYNAMIC DISSEMINATION OF INFORMATION TO NETWORK DEVICES

RELATED APPLICATIONS

This application is a continuation of U.S. patent application Ser. No. 15/962,013, filed Apr. 25, 2018, entitled "Dynamic Dissemination of Information to Network Devices," which is hereby incorporated by reference herein in its entirety.

FIELD OF THE INVENTION

The invention relates to dynamic dissemination of information to network devices via a network.

BACKGROUND OF THE INVENTION

Typically, pricing information in an order book is disseminated to a market participant regardless of the market participant's priority in the order book. Such dissemination of pricing information, however, frequently results in the pricing information being disseminated to substantially more market participants than reasonably necessary, resulting in leakage of the pricing information and inefficient or wasteful use of computational and network communication resources. In addition, due to the different latencies and speeds of transmission across different networks, the pricing information are received by the market participants' systems at different times. As such, many orders often become filled by some of the market participants' systems prior to other market participants' systems receiving the pricing information (or otherwise being able to act on the pricing information). Although the foregoing scenario causes the pricing information corresponding to the filled orders to be outdated for the remaining market participants, their systems nevertheless may act on the outdated pricing information, thereby further wasting computational and network communication resources. These and other drawbacks exist.

SUMMARY OF THE INVENTION

Aspects of the invention relate to methods, apparatuses, and/or systems for dynamically disseminating information to network devices.

One aspect of the disclosure relates to a method of dynamically disseminating information to network devices via a network. The method may include populating a data structure with values of a first type and values of a second type, assigning delay times to the first-type values based on priorities associated with the first-type values, and delivering data structure information obtained from the data structure to networks devices associated with the first-type values, where the delivery of the data structure information to the network devices is reflective of the assigned delay times. The method may further include ceasing delivery of the data structure information to other network devices in response to the data structure being updated and/or a certain value being accepted by a network device prior to the delivery of the data structure information to the other network devices. The method may further include obtaining a condition associated with a value and updating the data structure by removing the value from the data structure when the condition is satisfied. The condition may be satisfied when the value is included in the data structure for a predetermined amount of time and/or when the value has been delivered to network devices associated with a predetermined number of values. The data structure information may correspond to a snapshot of the data structure.

Another aspect of the disclosure relates to a system for dynamically disseminating information to network devices via a network. The system may populate a data structure with values of a first type and values of a second type, assign delay times to the first-type values based on priorities associated with the first-type values, and deliver data structure information obtained from the data structure to networks devices associated with the first-type values, where the delivery of the data structure information to the network devices is reflective of the assigned delay times. Further, the system may cease delivery of the data structure information to other network devices in response to the data structure being updated and/or a certain value being accepted by a network device prior to the delivery of the data structure information to the other network devices. Additionally, the system may obtain a condition associated with a value and update the data structure by removing the value from the data structure when the condition is satisfied. The condition may be satisfied when the value is included in the data structure for a predetermined amount of time and/or when the value has been delivered to network devices associated with a predetermined number of values. The data structure information may correspond to a snapshot of the data structure.

Various other aspects, features, and advantages of the invention will be apparent through the detailed description of the invention and the drawings attached hereto. It is also to be understood that both the foregoing general description and the following detailed description are exemplary and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

DETAILED DESCRIPTION OF THE INVENTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other instances, well-known structures and devices are illustrated in block diagram form in order to avoid unnecessarily obscuring the embodiments of the invention. As used in the specification and in the claims, the singular form of "a", "an", and "the" include plural referents unless the context clearly dictates otherwise. In addition, as used in the specification and the claims, the term "or" means "and/or" unless the context clearly dictates otherwise.

Figure 1:
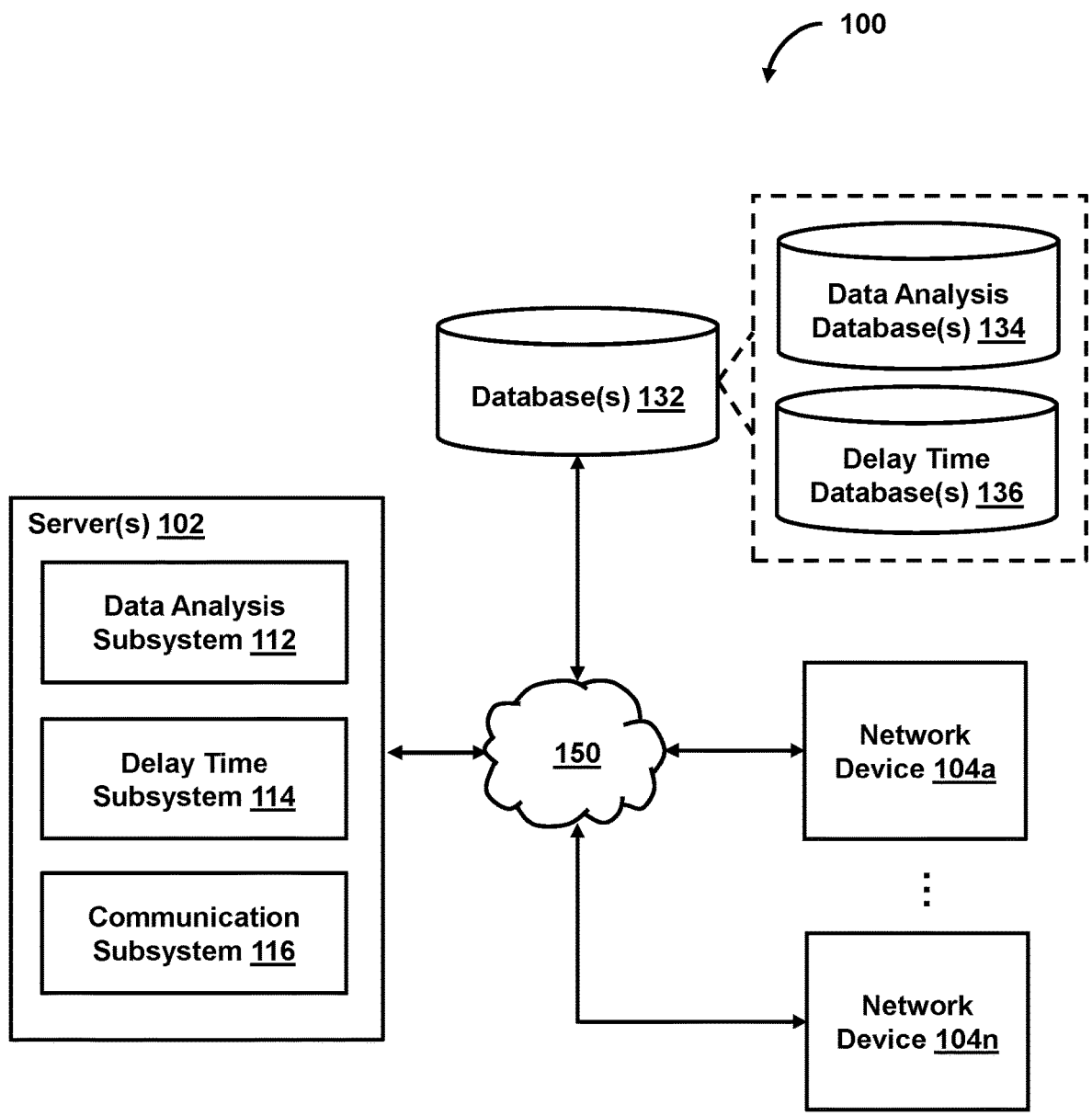
FIG. 1 illustrates a system for dynamically disseminating information to network devices via a network, in accordance with one or more embodiments.

FIG. 1 illustrates a system 100 for dynamically disseminating information to network devices via a network. As illustrated in FIG. 1, system 100 may include server(s) 102, network device 104 (or network devices 104a-104n), database 132, or other components. Server 102 (for example, a matching engine relating to an exchange or a trading platform) may include a data analysis subsystem 112, a delay time subsystem 114, a communication subsystem 116, or other components. Each network device 104 may include any type of mobile terminal, fixed terminal, or other device. By way of example, network device 104 may include a desktop computer, a notebook computer, a tablet computer, a smartphone, a wearable device, a server, or other network device. Users may, for instance, utilize one or more network devices 104 to interact with one another, one or more servers, or other components of system 100. It should be noted that, while one or more operations are described herein as being performed by particular components of server 102, those operations may, in some embodiments, be performed by other components of server 102 or other components of system 100. As an example, while one or more operations are described herein as being performed by components of server 102, those operations may, in some embodiments, be performed by components of network device 104. Further, although the database 132 is illustrated as being separate from the server 102 and the network device 104, the database 132 may be located within the network device 104 and/or server 102.

In some embodiments, data of a first type and data of a second type may be obtained by the server 102 (for example, via communication subsystem 116) from one or more network devices 104. The data of the first type may include one or more values of a first type, one or more quantities corresponding to the one or more values of the first type, information related to the value of the first type, and/or information regarding a network device associated with the one or more values of the first type. For example, a value of a first type may be an offer value from a network device 104. The offer value may correspond to a value at which an entity (for example, a market participant, a market maker, a market taker, a liquidity provider, or any individual) of the network device 104 is willing to sell a particular product. In addition to obtaining the value of the first type (for example, an offer value), the server 102 may also obtain a quantity value (for example, included in the data of the first type) corresponding to the offer value. The quantity value may correspond to a quantity of a particular product that the entity of the network device 104 is willing to sell at a particular offer value. In addition to obtaining the value of the first type (for example, an offer value), the server 102 may obtain information related to the value of the first type. Such information may correspond to a particular product (for example, a house, a financial product, etc.) that the entity of the network device 104 is willing to sell at a particular offer value. Alternatively, a value of a first type may be a bid value from a network device 104. The bid value may correspond to a value at which the entity of the network device 104 is willing to buy a particular product. In addition to obtaining the value of the first type (for example, a bid value), the server 102 may also obtain a quantity value (for example, included in the data of the first type) corresponding to the bid value. The quantity value may correspond to a quantity of a particular product that the entity of the network device 104 is willing to buy at a particular bid value. In addition to obtaining the value of the first type (for example, a bid value), the server 102 may obtain information related to the value of the first type. Such information may correspond to a particular product (for example, a house, a financial product, etc.) that the entity of the network device 104 is willing to buy at a particular bid value.

Similarly, the data of the second type may include one or more values of a second type, one or more quantities corresponding to the one or more values of the second type, information related to the value of the second type, and/or information regarding a network device associated with the one or more values of the second type. For example, a value of a second type may be an offer value from a network device 104. The offer value may correspond to a value at which the entity of the network device 104 is willing to sell a particular product. In addition to obtaining the value of the second type (for example, an offer value), the server 102 may also obtain a quantity value (for example, included in the data of the second type) corresponding to the offer value. The quantity value may correspond to a quantity of a particular product that the entity of the network device 104 is willing to sell at a particular offer value. In addition to obtaining the value of the second type (for example, an offer value), the server 102 may obtain information related to the value of the second type. Such information may correspond to a particular product (for example, a house, a financial product, etc.) that the entity of the network device 104 is willing to sell at a particular offer value. Information, such as quantity, may not be required. For example, a house being sold may likely not require quantity information in that it is a unique product and the offer value may simply refer to the price at which an entity is willing to sell the house and the bid values may simply refer to prices at which entities are willing to buy the house. In such a case where the particular product being transacted is a house, the server 102 may obtain additional information relating to the house such as financing conditions, etc.

Alternatively, a value of a second type may be a bid value from a network device 104. The bid value may correspond to a value at which the entity of the network device 104 is willing to buy a particular product. In addition to obtaining the value of the second type (for example, a bid value), the server 102 may also obtain a quantity value (for example, included in the data of the second type) corresponding to the bid value. The quantity value may correspond to a quantity of a particular product that the entity of the network device 104 is willing to buy at a particular bid value. In addition to obtaining the value of the second type (for example, a bid value), the server 102 may obtain information related to the value of the second type. Such information may correspond to a particular product (for example, a house, a financial product, etc.) that the entity of the network device 104 is willing to buy at a particular bid value. The server 102 may also keep a track of a time at which different data of the first type and data of the second type are received.

The server 102 (for example, data analysis subsystem 112) may generate and populate a data structure (that includes, for example, an order book or any other data relating to transacting a product) to include the obtained data of the first type and the second type. The data analysis subsystem 112 may dynamically and continuously populate and update the data structure based on obtained new data of the first type and the second type. It should be understood that the data structure may also be updated by removing any of the data of the first type and the second type. The server 102 (for example, the data analysis subsystem 112) may dynamically and continuously prioritize the data of the first type and the second type. For example, if the values of the first type correspond to offer values and the values of the second type correspond to bid values, the data analysis subsystem 112 may prioritize these values based on their numerical value. Specifically, the lowest value of the first type (for example, a lowest offer value) among the plurality of values of the first type (for example, a plurality of offer values) may be associated with (or assigned) the highest priority among a first set of priorities and the highest value of the first type (for example, a highest offer value) among the plurality of values of the first type (for example, the plurality of offer values) may be associated with (or assigned) the lowest priority among the first set of priorities. In other words, a higher value of the first type (for example, a higher offer value) may be associated with (or assigned) a lower priority than a lower value of the first type (for example, a lower offer value). Additionally, or alternatively, more than one value of the first type may be associated (or assigned) the same priority. In other words, more than one value of the first type (for example, values of the first type that are different from each other) may be grouped together to be associated with (or assigned) the same priority. For example, the two highest values of the first type may be associated with (or assigned) the lowest priority and the two lowest values of the first type may be associated with (or assigned) the highest priority.

Further, the lowest value of the second type (for example, a lowest bid value) among the plurality of values of the second type (for example, a plurality of bid values) may be associated with (or assigned) the lowest priority among a second set of priorities and the highest value of the second type (for example, a highest bid value) may be associated with (or assigned) the highest priority among the second set of priorities. In other words, a higher value of the second type (for example, a higher bid value) may be associated with (or assigned) a higher priority than a lower value of the second type (for example, a lower bid value). Additionally, or alternatively, more than one value of the second type may be associated (or assigned) the same priority. In other words, more than one value of the second type (for example, values of the second type that are different from each other) may be grouped together to be associated with (or assigned) the same priority. For example, the two highest values of the second type may be associated with (or assigned) the highest priority and the two lowest values of the second type may be associated with (or assigned) the lowest priority.

Additionally, or alternatively, the values of the first type and values of the second type may be prioritized based on a type of order (for example, limit order, hidden order, iceberg order, etc.) associated with these values. For example, values associated with a hidden order may have a lower priority than values associated with a visible order. The values of the first type and second type may also be prioritized based on a time at which they are obtained by the server 102.

Figure 2:
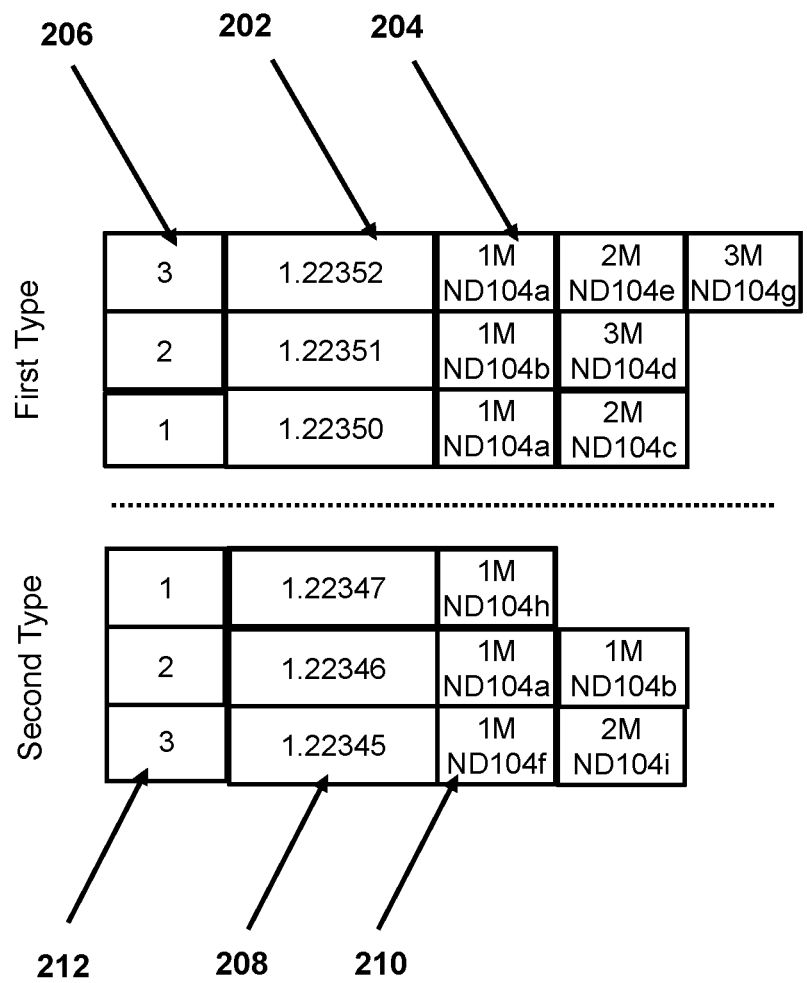
FIG. 2 illustrates contents of a data structure including data obtained from network devices, in accordance with one or more embodiments.

FIG. 2 illustrates contents of a data structure (for example, an order book in a continuous double-auction setting, or a central limit order book at a financial exchange) that includes data of the first and second types obtained from one or more network devices 104. The data structure includes values of a first type 202, quantity values 204 corresponding to the values of the first type 202, a first set of priorities 206 associated with the values of the first type 202, values of a second type 208, quantity values 210 corresponding to the values of the second type 208, and a second set of priorities 212 associated with the values of the second type 208. Although not illustrated in FIG. 2, the data structure may also include information related to the values of the first type and the second type. Such information may correspond to a particular product (for example, a house, a financial product, etc.) that an entity of a network device 104 is willing to buy/sell at a particular value. In addition to the quantity values 204, the data structure may also include information regarding network devices 104 associated with the values of the first type 202 and the quantity values 204. For example, as illustrated in FIG. 2, a value of a first type of 1.22350 is associated with a quantity of 1 million and network device 104a and with a quantity of 2 million and network device 104c. Similarly, in addition to the quantity values 210, the data structure may also include information regarding network devices 104 associated with the values of the second type 208. The order book in FIG. 2 illustrates the positions (or priorities) of the values and the network devices associated with the values in the order book. For example, the values 1.22350 (and associated network devices 104a and 104c) and 1.22347 (and associated network device 104h) are at the top of the order book. In other words, the values 1.22350 (and associated network devices 104a and 104c) and 1.22347 (and associated network device 104h) are associated with the highest priorities (from among the first set of priorities 206 and a second set of priorities 212).

If the values of the first type 202 are, for example, offer values, then the offer values may correspond to values at which entities of the network devices 104 are willing to sell a particular product, and the quantity values 204 may correspond to quantities of the particular product that the entities of the network devices 104 are willing to sell at the particular offer values. For example, an offer value of 1.22350 may correspond to a value at which an entity of network device 104a is willing to sell a particular product, and the quantity value of 1 million may correspond to a quantity of the particular product that the entity of the network device 104a is willing to sell at the offer value of 1.22350. Alternatively, if the values of the first type 202 are, for example, bid values, then the bid values may correspond to values at which entities of the network devices 104 are willing to buy a particular product, and the quantity values 204 may correspond to quantities of the particular product that the entities of the network devices 104 are willing to buy at the particular bid values. For example, a bid value of 1.22350 may correspond to a value at which an entity of network device 104a is willing to buy a particular product, and the quantity value of 1 million may correspond to a quantity of the particular product that the entity of the network device 104a is willing to buy at the bid value of 1.22350.

If the values of the second type 208 are, for example, offer values, then the offer values may correspond to values at which entities of the network devices 104 are willing to sell a particular product, and the quantity values 210 may correspond to quantities of the particular product that the entities of the network devices 104 are willing to sell at the particular offer values. For example, an offer value of 1.22347 may correspond to a value at which an entity of network device 104h is willing to sell a particular product, and the quantity value of 1 million may correspond to a quantity of the particular product that the entity of the network device 104h is willing to sell at the offer value of 1.22347. Alternatively, if the values of the second type 208 are, for example, bid values, then the bid values may correspond to values at which entities of the network devices 104 are willing to buy a particular product, and the quantity values 210 may correspond to quantities of the particular product that the entities of the network devices 104 are will to buy at the particular offer values. For example, a bid value of 1.22347 may correspond to a value at which an entity of network device 104h is willing to buy a particular product, and the quantity value of 1 million may correspond to a quantity of the particular product that the entity of the network device 104h is willing to buy at the bid value of 1.22347.

As illustrated in FIG. 2, the values of the first type 202 and second type 208 are associated with a first set of priorities 206 and a second set of priorities 212, respectively. The server 102 (for example, the data analysis subsystem 112) may dynamically and continuously prioritize the values of the first type 202 and the second type 208. Specifically, the data analysis system 112 may prioritize the values of the first type 202 such that a lowest value of the first type (for example, 1.22350) may be associated with (or assigned) a highest priority (for example, priority 1) from the first set of priorities 206 and a highest value of the first type (for example, 1.22352) may be associated with (or assigned) a lowest priority (for example, priority 3) from the first set of priorities 206. In other words, a higher value of the first type 202 may be associated with (or assigned) a lower priority than a lower value of the first type 202. Additionally, or alternatively, as noted above, more than one value of the first type may be associated (or assigned) the same priority. In other words, more than one value of the first type (for example, values of the first type that are different from each other) may be grouped together to be associated with (or assigned) the same priority. For example, the two highest values of the first type may be associated with (or assigned) the lowest priority and the two lowest values of the first type may be associated with (or assigned) the highest priority.

Further, the data analysis system 112 may prioritize the values of the second type 208 such that a lowest value of the first type (for example, 1.22345) may be associated with (or assigned) a lowest priority (for example, priority 3) from the second set of priorities 212 and a highest value of the second type (for example, 1.22347) may be associated with (or assigned) a highest priority (for example, priority 1) from the second set of priorities 212. In other words, a higher value of the second type 208 may be associated with (or assigned) a higher priority than a lower value of the second type 208. Additionally, or alternatively, as noted above, more than one value of the second type may be associated (or assigned) the same priority. In other words, more than one value of the second type (for example, values of the second type that are different from each other) may be grouped together to be associated with (or assigned) the same priority. For example, the two highest values of the second type may be associated with (or assigned) the highest priority and the two lowest values of the second type may be associated with (or assigned) the lowest priority.

It should be understood that the priorities associated with values of the first type 202 and second type 208 are dynamically and continuously updated. For example, prior to the value of the second type of 1.22347 being added to the data structure illustrated in FIG. 2, the values of the second type of 1.22346 and 1.22345 were associated with priorities type 1 and 2, respectively. When the value of the second type of 1.22347 is added to the data structure, the priorities associated with the values of the second type are updated such that the value of 1.22347 is associated with (or assigned) the highest priority (for example, priority 1) and the values of 1.22346 and 1.22345 are associated with (or assigned) priorities 2 and 3, respectively. Similarly, if a value (for example, a value of the first type 202) is removed from the data structure, then the priorities associated with the other values of the first of the first 202 are updated. The updating of priorities associated with the values of the first type 202 and the second type 208 is dynamic and continuous. The data structure may be stored in the server 102 and/or the data analysis database 134. Since the data structure may be continuously and dynamically updated, the data structure may be stored along with a time stamp to indicate the latest time at which the data structure was updated.

Although examples above describe the values of the first type 202 and the second type 208 as offer values and bid values, it should be understood that the values of the first type 202 and the second type 208 may correspond to any other type of data that may help facilitate transacting a product between entities of network devices 104.

In addition to prioritizing values, the server 102 may also prioritize network devices 104 associated with the values based on a time at which a value was obtained from a network device 104. For example, as illustrated in FIG. 2, network devices 104a and 104c are associated with a value 1.22350 that is associated with a first priority. The network devices 104a and 104c may be prioritized based on a time at which the server 102 obtained the value 1.22350 from these network devices 104a and 104c. For example, if value 1.22350 was obtained from network device 104a before the value 1.22350 was obtained from network device 104c, then the server 102 may assign a higher priority to network device 104a than network device 104c. In addition to using the time at which a value was obtained from a network device 104 to determine a priority of a network device 104, the network devices 104 may also be prioritized based on a distance of the network device 104 from the server 102, a received signal strength from the network device 104, a likelihood that the network devices 104 will accept an offer value or a bid value for transacting a product (for example, based on recent historical information such as historical volume traded by the network devices), historical volume traded by the network devices 104, a type of an order (for example, limit order, hidden order, and/or iceberg order) associated with the values obtained from the network devices 104, etc.

The server 102 (for example, delay time subsystem 114) may assign delay times (for example, 0 milliseconds, 3 milliseconds, 5 milliseconds, 10 milliseconds, 1 second, 3 seconds, etc.) to the values of the first type 202 and the values of the second type 208. The server 102 may, for example, obtain a set of delay times stored in the delay time database 136 and may assign delay times to the values of the first type 202 and the values of the second type 208 based on the priorities associated with the values of the first type 202 and the values of the second type 208. For example, the delay time subsystem 114 may assign a first delay time (for example, delay time D1) to values (for example, among the values of the first type 202 and the values of the second type 208) associated with a first priority (for example, priority 1), a second delay time (for example, delay time D2) to values (for example, among the values of the first type 202 and the values of the second type 208) associated with a second priority (for example, priority 2), a third delay time (for example, delay time D3) to values (for example, among the values of the first type 202 and the values of the second type 208) associated with a third priority (for example, priority 3), etc. In the example illustrated in FIG. 2, the delay time subsystem 114 may assign a first delay time to values 1.22350 and 1.22347 that are associated with priority 1 (from among a first set of priorities 206 and a second set of priorities 212), a second delay time to values 1.22351 and 1.22346 that are associated with priority 2 (from among a first set of priorities 206 and a second set of priorities 212), and a third delay time to values 1.22352 and 1.22345 that are associated with priority 3 (from among a first set of priorities 206 and a second set of priorities 212). The first delay time may be less than the second and third delay times, and the second delay time may be less than the third delay time. In other words, a value associated with a higher priority is assigned a smaller delay time than a value associated with a lower priority. For example, value 1.22350 may be assigned a delay time that is less than a delay time assigned to value 1.22352 and value 1.22347 may be assigned a delay time that is less than a delay time assigned to value 1.22345.

Further, when multiple values of a first type are associated with (or assigned) the same priority, the multiple values of the first type may be assigned a same delay time. Similarly, when multiple values of a second type are associated with (or assigned) the same priority, the multiple values of the second type may be assigned a same delay time.

Alternatively, a first set of delay times may be assigned to the values of the first type 202 and a second set of delay times may be assigned to the values of the second type 208. For example, the server 102 may obtain a first set of delay times and a second set of delay time stored in the delay time database 136 and may assign the first set of delay times to the values of the first type 202 and the second set of delay times to the values of the second type 208 based on the priorities associated with the values of the first type 202 and the values of the second type 208. For example, the delay time subsystem 114 may assign a first delay time to value 1.22350 that is associated with priority 1 (from among a first set of priorities 206), a second delay time to value 1.22351 that is associated with priority 2 (from among a first set of priorities 206), a third delay time to value 1.22352 that is associated with priority 3 (from among a first set of priorities 206), a fourth delay time to value 1.22347 that is associated with priority 1 (from among a second set of priorities 212), a fifth delay time to value 1.22346 that is associated with priority 2 (from among a second set of priorities 212), and a sixth delay time to value 1.22345 that is associated with priority 3 (from among a second set of priorities 212). Here, the first delay time may be less than the second and third delay times, and the second delay time may be less than the third delay time. Also, the fourth delay time may be less than the fifth and sixth delay times, and the fifth delay time may be less than the sixth delay time. The first delay time may be equal to or different (less or more) from the fourth delay time, the second delay time may be equal to or different (less or more) from the fifth delay time, and the third delay time may be equal to or different (less or more) from the sixth delay time.

Additionally, or alternatively, based on the priority associated with the values and the priorities associated with the network devices 104, the server 102 may assign multiple delay times to a single value such that a different delay time is associated with a different network device 104. For example, the value 1.22350 in FIG. 2 may be assigned two delay times such that one delay time is associated with network device 104a and another delay time is associated with network device 104c. Among the two delay times assigned to the value 1.22350, a smaller delay time may be assigned to a network device (for example, from among network devices 104a and 104c) that has a higher priority. Similarly, values 1.22351, 1.22352, 1.22346, and 1.22345 in FIG. 2 may be assigned multiple delay times such that different network devices associated with the same value are assigned different delay times. The delay times associated with value 1.22350 may be smaller than delay times associated with values 1.22351 and 1.22352 since value 1.22350 has a higher priority than values 1.22351 and 1.22352. Similarly, delay times assigned to value 1.22347 may be smaller than delay times assigned to values 1.22346 and 1.22345 since value 1.22347 has a higher priority than values 1.22346 and 1.22345.

The server 102 may obtain data structure information (for example, one or more values of the data structure in FIG. 2 or a snapshot of one or more values of the data structure in FIG. 2) from the data structure and initiate delivery of the data structure information to one or more network devices 104 based on the assigned delay times. The data structure information may or may not include the priorities 206 and 212 noted in FIG. 2. As noted above, delay times are assigned to values of the first type 202 and second type 208 based on priorities associated with the values of the first type 202 and second type 208 and/or priorities associated with network devices 104. FIG. 2 also illustrates network devices 104 that are associated with the values of the first type 202 and second type 208. For example, as illustrated in FIG. 2, network device 104a is associated with values 1.22350, 1.22352, and 1.22346, network device 104b is associated with values 1.22351 and 1.22346, network device 104c is associated with value 1.22350, network device 104d is associated with value 1.22351, network device 104e is associated with value 1.22352, network device 104f is associated with value 1.22345, network device 104g is associated with value 1.22352, network device 104h is associated with value 1.22347, and network device 104i is associated with value 1.22345. Accordingly, based on such associations between the network devices 104 and the values, the delivery of the data structure information to network devices 104a, 104c, and 104h (for example, network devices 104 that are associated with values associated with priority 1 among the first set of priorities 206 and the second set of priorities 212) may be reflective of a first delay time (or multiple first delay times), the delivery of the data structure information to network devices 104b and 104d (for example, network devices 104 that are associated with values associated with priority 2 among the first set of priorities 206 and the second set of priorities 212) may be reflective of a second delay time (or multiple second delay times) (note that although network device 104a is also associated with priority 2 among the second set of priorities 212, the delivery of the data structure information to network device 104a may not be reflective of a second delay time because delivery of the data structure information to network device 104a is already reflective of a first delay time), and delivery of the data structure information to network devices 104e, 104g, 104f, and 104i (for example, network devices 104 that are associated with values associated with priority 3 among the first set of priorities 206 and the second set of priorities 212) may be reflective of a third delay time (or multiple third delay times) (note that although network device 104*a* is also associated with priority 3 among the first set of priorities 206, the delivery of the data structure information to network device 104*a* may not be reflective of a third delay time because delivery of the data structure information to network device 104*a* is already reflective of a first delay time).

Figure 3:
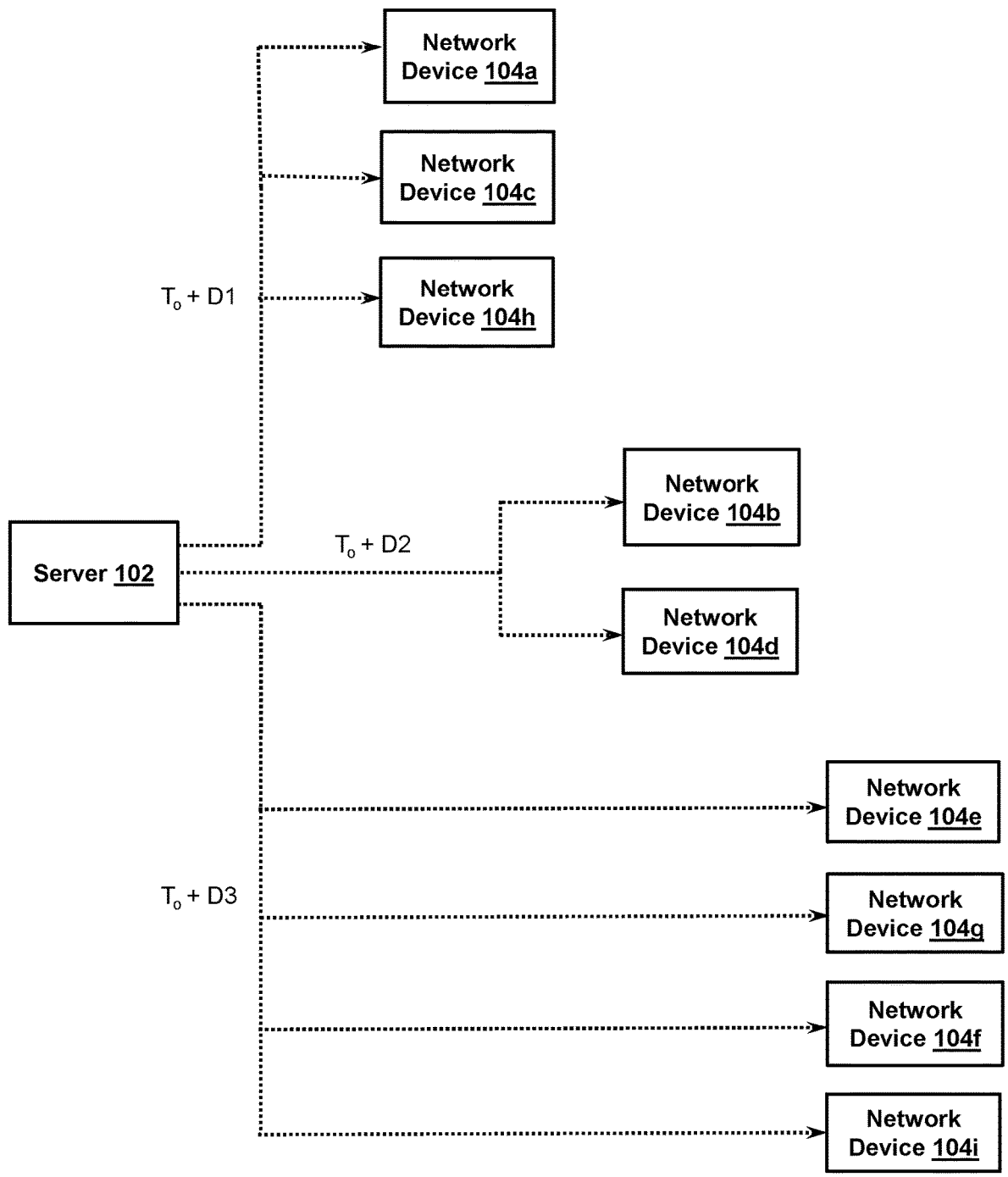
FIG. 3 illustrates delivery of data structure information to network devices.

For example, as illustrated in FIG. 3, the data structure information may be delivered to network devices 104*a*, 104*c*, and 104*h* at time $T_o+D1$ (where $T_o$ may correspond to any time (for example, it may be the time of last update of the data structure) and D1 is a first delay time), the data structure information may be delivered to network devices 104*b* and 104*d* at time $T_o+D2$ (where D2 is a second delay time that is greater than D1), and the data structure information may be delivered to network devices 104*e*, 104*g*, 104*f*, and 104*i* at time $T_o+D3$ (where D3 is a third delay time that is greater than D1 and D2). In other words, the data structure information may be delivered to network devices 104 that are associated with values with higher priorities before delivering the data structure information to network devices that are associated with values with lower priorities. The data structure information may be delivered to the network devices 104 via, for example, network 150 illustrated in FIG. 1. Accordingly, the delivery of the data structure information to the network devices 104 reflects the assigned delay times to the values (which are assigned based on priorities associated with the values) in the data structure illustrated in FIG. 2. The data structure information that is delivered to the network devices 104 based on the assigned delay times may be displayed to entities of the network device 104 via a display. The data structure and/or data structure information may be delivered using one or more electronic communications protocols (for example, Financial Information eXchange (FIX), ITCH protocol, and/or OUCH protocol).

The difference between the first and second delay times may be based on a difference between a value of the first type associated with a first priority and another value of the first type associated with a second priority (and/or a difference between a value of the second type associated with a first priority and another value of the second type associated with a second priority), the difference between the second and third delay times may be based on a difference between a value of the first type associated with a second priority and another value of the first type associated with a third priority (and/or a difference between a value of the second type associated with a second priority and another value of the second type associated with a third priority), and the first and third delay times may be based on a difference between a value of the first type associated with a first priority and another value of the first type associated with a third priority (and/or a difference between a value of the second type associated with a first priority and another value of the second type associated with a third priority). For example, a smaller difference between a value of the first type associated with a first priority and another value of the first type associated with a second priority may result in a smaller difference between the first and second delay times compared to a larger difference between a value of the first type associated with a first priority and another value of the first type associated with a second priority. In other words, the difference between the first and second delay times may be directly proportional to a difference between a value of the first type associated with a first priority and another value of the first type associated with a second priority (and/or a difference between a value of the second type associated with a first priority and another value of the second type associated with a second priority). Accordingly, in addition to the delay times being assigned based on priorities associated with the values and/or the network devices, the delay times may be assigned based on differences between values associated with different priorities.

In addition to delivering data structure information to the network devices 104, the server 102 may also deliver match information to the network devices 104. For example, if a new offer value that is received by the server 102 matches the bid value in the data structure, the server 102 may execute a trade and the match information (for example, the trade) may be notified to the network devices 104 associated with the new offer value and the bid value that matched. The match information may be delivered to network devices 104 based on the assigned delay times described above. For example, the match information may be delivered first to the network devices 104 associated with the new offer value and the bid value that matched and then the match information may be delivered to other network devices 104 based on the assigned delay times discussed above. In other words, in addition to delivering data structure information to the network devices 104 based on the assigned delay times, the server 102 may also deliver match information to the network devices 104 based on the assigned delay times.

Delivering the data structure information to some network devices before other network devices based on the assigned delay times has several advantages. For instance, the server 102 may utilize less computing resources to prepare for the delivery of the data structure information. That is, in the example illustrated in FIG. 3, the server 102 may have to utilize its computing resources to deliver the data structure information to only three network devices (for example, network devices 104*a*, 104*c*, and 104*h*) at time a particular time (for example, at time $T_o+D1$) instead of utilizing its computing resources to deliver the data structure information at the same time to all the network devices 104 (e.g., over a thousand network devices, over ten thousand network devices, over a million network devices, over a billion network devices, etc.). This may help the server 102 focus its computing resources on other functions to be performed by the server 102. Further, by delivering the data structure information to some network devices before other network devices based on the assigned delay times, the server 102 may ensure that less communication resources (or network resources) (for example, between server 102 and the network devices 104) are utilized at any given time. That is, in the example illustrated in FIG. 3, the server 102 may deliver the data structure information to different network devices 104 at different times, thereby ensuring that less communication resources are utilized at any given time. This may help prevent the communication resources from clogging up at any given time.

Moreover, for example, the delivery of the data structure information to some network devices before other network devices enables greater efficient use of computational and network communication resources because further delivery of one or more portions of the data structure information (e.g., some of the pricing information) to the other network devices may be avoided in response to one or more conditions. As an example, with respect to an order book, if certain bid values or offer values in the order book are accepted (and/or the corresponding orders are filled) by some of the market participants' systems prior to other market participants' systems receiving the bid values or offer values (or otherwise being able to act on the bid values or offer values), further delivery of the accepted bid values or offer values may be avoided, thereby saving computational and network communication resources.

In addition, for instance, an entity (for example, a market maker) of a network device associated with the highest priority gets to view the data structure information (for example, possibly new offer values and bid values) before other entities of other network devices and is able to interact with the bid or offer values in the data structure information before anyone else. Such interaction may be in the form of trading with the newly arrived new offer values or bid values before other market participants can do so. For example, when a new offer value is added to the data structure, a network device 104 associated with a highest bid value may receive the new offer value first, thereby, allowing this network device 104 to match its bid value to the newly added offer value. In other words, when a new offer value is added to the data structure, the network device 104 associated with the highest priority may respond to this new offer value by amending its previous bid value to match the new offer value or sending a new bid value to match the new offer value to the server 102. This way, when the server 102 receives an amended bid value or a new bid value (from the network device 104) that matches the new offer value, a match is created. Further, delivering the data structure information to some network devices before other network devices based on the assigned delay times will likely promote more liquidity at a top of the order book. Since there is a clear benefit of being at the top of the order book, market makers may be more inclined to provide competitive prices (for example, offer values or bid values) that are likely to secure the top of the order book prices and therefore the highest priority in receiving data. Also, delivering the data structure information to some network devices before other network devices based on the assigned delay times may increase the probability that a trade will occur and decrease the probability of information leakage. Delivering the data structure information to some network devices before other network devices based on the assigned delay times also has advantages for the market taker. For instance, delivering the data structure information to some network devices before other network devices ensures more liquidity at a top of the order book and since the data structure information is not delivered to all the network devices at once, the market taker has some additional time to execute on other platforms.

Further, delivering the data structure information as a snapshot of the data structure also has advantages. For instance, the server 102 may utilize less computing resources if it delivers the data structure information as a snapshot instead of delivering the entire data structure. Also, by delivering a snapshot of the data structure, the server 102 may ensure that less communication resources (or network resources) (for example, between server 102 and the network devices 104) are utilized. The snapshot of the data structure may be a pictorial representation of the data structure and the snapshot of the data structure may utilize less memory than the data structure. Further, any subsequent updates to the data structure that are delivered to the network devices 104 may include only the changes to the data structure (for example, changes to the snapshot) such that only the changes are delivered to the network devices 104 after an update to the data structure. This may help the server 102 utilize less computing resources as it needs to deliver only the changes and may ensure that less communication resources (or network resources) are also used as only the changes to the data structure are delivered.

Alternatively, the data structure information may be delivered at the same time to all the network devices 104 and may only be opened by the network devices 104 based on the delay time associated with the network devices 104. In other words, the server 102 may deliver the data structure information to all network device 104 and utilize a mechanism by which the data structure information can only be opened by (or displayed at) a particular network device at a particular delay time. For example, if the data structure information in FIG. 3 is delivered to all the network devices 104 at the same time, the server 102 may include information along with the data structure information such that the data structure information can only be opened by (or displayed at) network devices 104a, 104c, and 104h after a delay time of D1, network devices 104b and 104d after a delay time of D2, and network devices 104e, 104g, 104f, and 104i after a delay time of D3. In another alternative, the network 150 may include a buffer that receives the data structure information at a particular time and delivers the data structure information to the different devices 104 based on the assigned delay times. In other words, if network 150 receives the data structure information at time $T_o$, the network 150 may buffer the data structure information such that the data structure information is delivered to network devices 104a, 104c, and 104h after a delay time of D1, network devices 104b and 104d after a delay time of D2, and network devices 104e, 104g, 104f, and 104i after a delay time of D3. The may help free up server's computing resources as the network 150 may handle the delivery of the data structure information to the different network devices based on the delay times.

Figure 4:
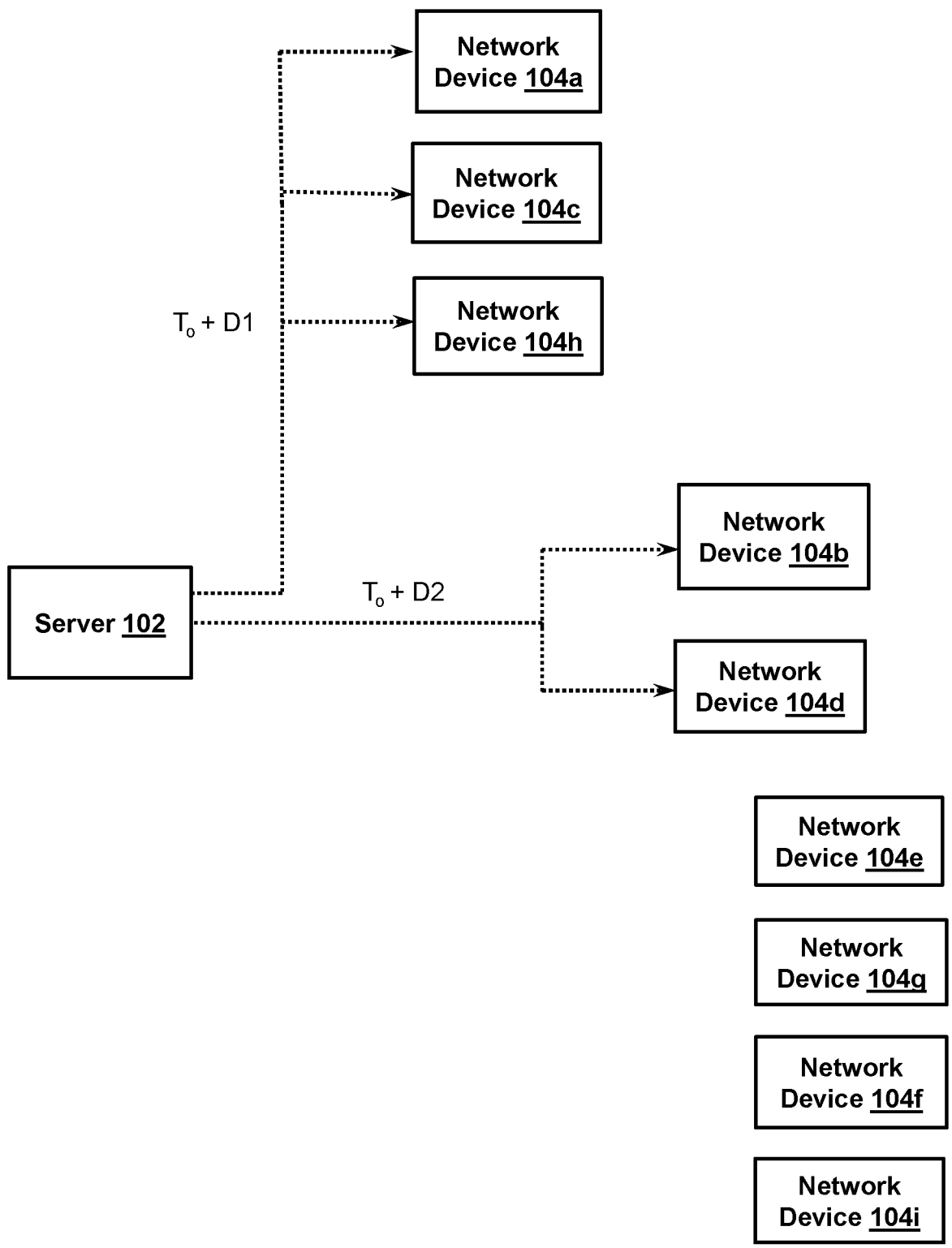
FIG. 4 illustrates delivery of data structure information to some of the network devices.

FIG. 4 illustrates the delivery of the data structure information to certain network devices 104 and ceasing the delivery of the data structure information to other network devices 104. When the data structure is updated with at least a new value (or updated by removing at least a value that was previously included in the data structure) from among the data of the first type second type, the server 102 may cease (stop or halt) delivery of the data structure information to certain devices. For example, as illustrated in FIG. 4, data structure information may be delivered to network devices 104a, 104c, and 104h at time $T_0+D1$ and to network devices 104b and 104d at time $T_0+D2$. When the data structure is updated at a time between $T_0+D2$ (the time for delivering the data structure information to network devices 104b and 104d) and $T_0+D3$ (the time for delivering the data structure information to network devices 104e, 104g, 104f, and 104i), the server 102 may cease delivery of the data structure information to network devices 104e, 104g, 104f, and 104i. In other words, the server 102 may cease delivery of the data structure information to network devices 104e, 104g, 104f, and 104i in response to the data structure being updated prior to the delivery of the data structure information to the network devices 104e, 104g, 104f, and 104i. In this way, for example, further delivery of the now-outdated data structure information may be avoided, thereby saving computational and network communication resources.

When the server 102 ceases delivery of the data structure information to network devices 104e, 104g, 104f, and 104i in response to the data structure being updated with at least a new value (or updated by removing at least a value that was previously included in the data structure), the server 102 may repeat the above-described process of associating (or assigning) new priorities to values of the first type 202 and values of the second type 208 (that are included in the updated data structure), assigning new delay times to the values based on the new priorities associated with these values, initiating delivery of the updated data structure information to be reflective of the newly assigned delay times, and delivering the updated data structure information to the network devices 104 (that are associated with the values of the first type 202 and values of the second type 208 in the updated data structure), where the delivery of the updated data structure information to the network devices 104 reflects the assigned new delay times. In other words, whenever the data structure is updated, the server 102 may associate (or assign) new priorities to the values in the data structure, assign new delay times to the values in the data structure based on the newly associated priorities, and deliver the updated data structure information to network devices based on the newly assigned delay times.

Further, the server 102 may cease delivery of the data structure information to the network devices 104e, 104g, 104f, and 104i when one or more values within the data structure information has been accepted by one or more of the network devices 104 (for example, network devices 104a, 104c, 104b, and 104d that have previously received the data structure information) prior to the delivery of the data structure information to the network devices 104e, 104g, 104f, and 104i. As noted above, the values of the first type 202 may correspond to offer values and values of the second type 208 may correspond to bid values. When the data structure information is delivered to network devices 104a and 104c at time $T_0+D1$, the entities of the network devices 104a and 104c have an opportunity to accept a bid value (for example, the highest bid value 1.22347) and possibly a quantity associated with the bid value. That is, the network devices 104a and 104c (that have an associated offer value of 1.22350) may have an opportunity to accept a bid value of 1.22347 for transacting a particular product. In other words, the network devices 104a and 104c may have the opportunity to reduce their previous offer value from 1.22350 to 1.22347 (or send a new offer value corresponding to 1.22347) so as to match with the bid value of 1.22347 for transacting a particular product before other network devices 104 that are associated with a lower priority. Similarly, when the data structure information is delivered to network devices 104b and 104d at time $T_0+D2$, the entities of the network devices 104b and 104d have an opportunity to accept a bid value (for example, the highest bid value 1.22347) and a quantity associated with the bid value. That is, the network devices 104b and 104d (that have an associated offer value of 1.22351) may have an opportunity to accept a bid value of 1.22347 for transacting a particular product. In other words, the network devices 104b and 104d may have the opportunity to reduce their previous offer value from 1.22351 to 1.22347 (or send a new offer value corresponding to 1.22347) so as to match with the bid value of 1.22347 for transacting a particular product.

Figure 5:
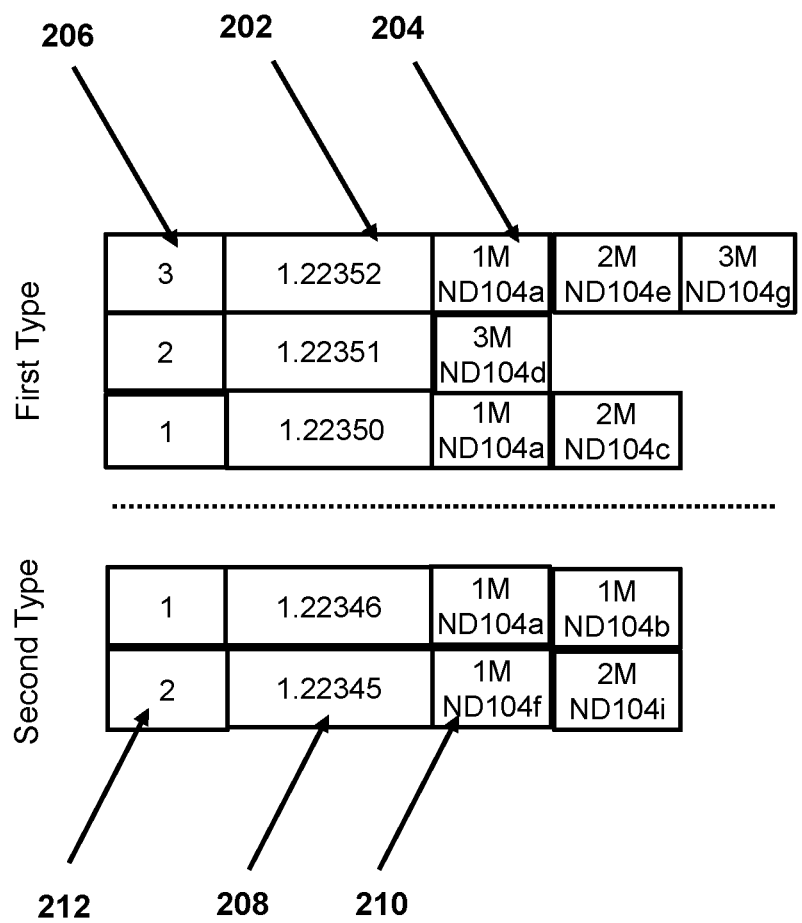
FIG. 5 illustrates contents of an updated data structure including data obtained from network devices, in accordance with one or more embodiments.

If, for example, network device 104b accepts the bid value (for example, by signaling to the sever 102 that the network device 104b wishes to lower its previous offer value to match the bid value or by sending a new offer value that matches the bid value to the sever 102) of 1.22347 associated with network device 104h, then the data structure may be updated by removing the bid value 1.22347 (and its associated quantity value and information regarding the network device associated with the bid value) and the offer value 1.22351 (associated with the network device 104b). FIG. 5 illustrates contents of such an updated data structure. As illustrated in FIG. 5, when an entity of the network device 104b accepts the bid value of 1.22347 associated with network device 104h, the quantity value 204 corresponding to network device 104b (which is associated with the offer value of 1.22351) is removed, the bid value of 1.22347 associated with the network device 104h and its corresponding quantity value 104 are removed, and the second set of priorities 212 associated with the values of the second type 208 are updated based on the removal of the bid value of 1.22347.

When, for example, an entity of the network device 104b accepts the bid value (for example, by signaling to the sever 102 that the network device 104b wishes to lower its previous offer value to match the bid value or by sending a new offer value that matches the bid value to the sever 102) of 1.22347 associated with network device 104h between time $T_0+D2$ and $T_0+D3$, the server 102 may cease delivery of the data structure information (since the data structure information has been updated based on the acceptance of the bid value) to the network devices 104e, 104g, 104f, and 104i. In other words, as illustrated in FIG. 4, the server 102 may cease delivery of the data structure information to the network devices 104e, 104g, 104f, and 104i in response to a bid value being accepted by network device 104b prior to the delivery of the data structure information to the network devices 104e, 104g, 104f, and 104i. Although the above example indicates that network device 104b accepted the bid value, it should be understood that any network device (for example, network devices 104a, 104c, or 104d to which the server 102 delivers the data structure information at time $T_0+D1$ or $T_0+D2$) may accept the bid value. In addition to ceasing delivery of the data structure information to the network devices 104e, 104g, 104f, and 104i, the server 102 may deliver match information to the network devices 104. For example, when the network device 104b accepts the bid value (for example, by signaling to the sever 102 that the network device 104b wishes to lower its previous offer value to match the bid value or by sending a new offer value that matches the bid value to the sever 102) of 1.22347 associated with network device 104h, the server 102 may first deliver the match information (for example, the match between the bid value and the offer value) to network device 104b and 104h, and then deliver the match information to other network devices 104 based on the assigned delay times discussed above.

Ceasing delivery of the data structure information in response to the data structure being updated or in response one or more values of the first type or a second type being accepted by an entity of a network device has several advantages. For instance, the server 102 may utilize less computing resources by avoiding delivery of the data structure information to certain network devices 104. That is, in the example illustrated in FIG. 4, the server 102 may have to utilize its computing resources to deliver the data structure information to only five network devices (for example, network devices 104a, 104c, 104h, 104b, and 104d) instead of utilizing its computing resources to deliver the data structure information to all the network devices 104 (e.g., over a thousand network devices, over ten thousand network devices, over a million network devices, over a billion network devices, etc.). This may help the server 102 focus its computing resources on other functions to be performed by the server 102. Further, by ceasing delivery of the data structure information to network devices 104e, 104g, 104f, and 104i, server 102 may ensure that less communication resources (or network resources) (for example, between server 102 and the network devices 104) are utilized. That is, in the example illustrated in FIG. 4, the server 102 may deliver the data structure information to some network devices (for example, network devices 104a, 104c, 104h, 104b, and 104d) while avoiding the need to deliver the data structure information to other network devices (for example, network devices 104e, 104g, 104f, and 104i). This way, less communication resources may be used since delivery of the data structure information to certain network devices 104 can be avoided.

It should be understood that associating priorities with the values, assigning delay times to the values based on the associated priorities, and delivering data structure information to network devices associated with certain values reflective of assigned delay times are dynamically and continuously updated.

Further, the server 102 may obtain a condition associated with a value of the first type 202 or a value of the second type 208 from a network device 104. The condition may relate to removing the value of the first type 202 or the value of the second type 208 from the data structure when the condition is satisfied. For instance, in addition to obtaining a value of a second type of 1.22347 illustrated in FIG. 2, a condition associated with the value 1.22347 may also be obtained. The condition may include retaining the value 1.22347 within the data structure for a predetermined amount of time and automatically removing the value 1.22347 from the data structure after the predetermined amount of time has lapsed. The removal of the value 1.22347 would result in an updated data structure. Additionally, or alternatively, the condition may include retaining the value of 1.22347 within the data structure until the value of 1.22347 (included in data structure information) has been delivered to network devices associated with a predetermined number of values of the first type or with values associated with a predetermined number of priorities. For example, the condition may include retaining the value of 1.22347 within the data structure until the value of 1.22347 has been delivered to network devices associated with three values of the first type (for example, values 1.22350, 1.22351, and 1.22352) or with values associated with the first three priorities. In other words, the value 1.22347 will be retained within the data structure until the value 1.22347 has be delivered to network devices 104a, 104c, 104b, 104d, 104e, and 104g (for example, the network devices associated with the values of the first type 202 that are associated with the first three priorities of the first set of priorities 206). After the value of 1.22347 (included in data structure information) has been delivered to network devices 104a, 104c, 104b, 104d, 104e, and 104g, the value 1.22347 may be automatically removed from the data structure and the data structure may be updated based on the removal of such a value.

Although a value of a first type 202 or a value of a second type 208 may be removed when a condition associated with the value of the first type 202 or the value of the second type 208 is satisfied, it should be understood that such a value may be removed before a condition is satisfied when the value is accepted by a network device 104. As illustrated in FIG. 5, for example, when an entity of the network device 104b accepts the bid value of 1.22347 associated with network device 104h, the quantity value 204 corresponding to network device 104b (which is associated with the offer value of 1.22351) is removed, the bid value of 1.22347 associated with the network device 104h and its corresponding quantity value 104 are removed, and the second set of 212 of the values of the second type 208 are updated based on the removal of the bid value of 1.22347. Accordingly, the value of the first type 202 or the value of the second type 208 may be removed from the data structure before the condition is satisfied when the value of the first type 202 or the value of the second type 208 is accepted by a network device 104.

Removing a value of a first type 202 or a value of a second type 208 from the data structure when a condition is satisfied has several advantages. For instance, by removing the value of the first type 202 or the value of the second type 208 from memory when a condition is satisfied, the server 102 may utilize less memory and this may ensure that there is always enough memory to store new values. Further, removing the value of the first type 202 or the value of the second type 208 in memory when a condition is satisfied may ensure that less communication resources (or network resources) (for example, between server 102 and the network devices 104) are utilized. That is, by removing the value of the first type 202 or the value of the second type 208 from memory when a condition is satisfied (for example, by delivering only to network devices associated with a predetermined number of priorities), the server 102 may not need to deliver the data structure information to all the network devices 104, thereby ensuring that less communication resources are utilized.

Example Flowcharts

The processing operations of the methods presented below are intended to be illustrative and non-limiting. In some embodiments, for example, the methods may be accomplished with one or more additional operations not described, and/or without one or more of the operations discussed. Additionally, the order in which the processing operations of the methods are illustrated (and described below) is not intended to be limiting.

In some embodiments, the methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

Figure 6:
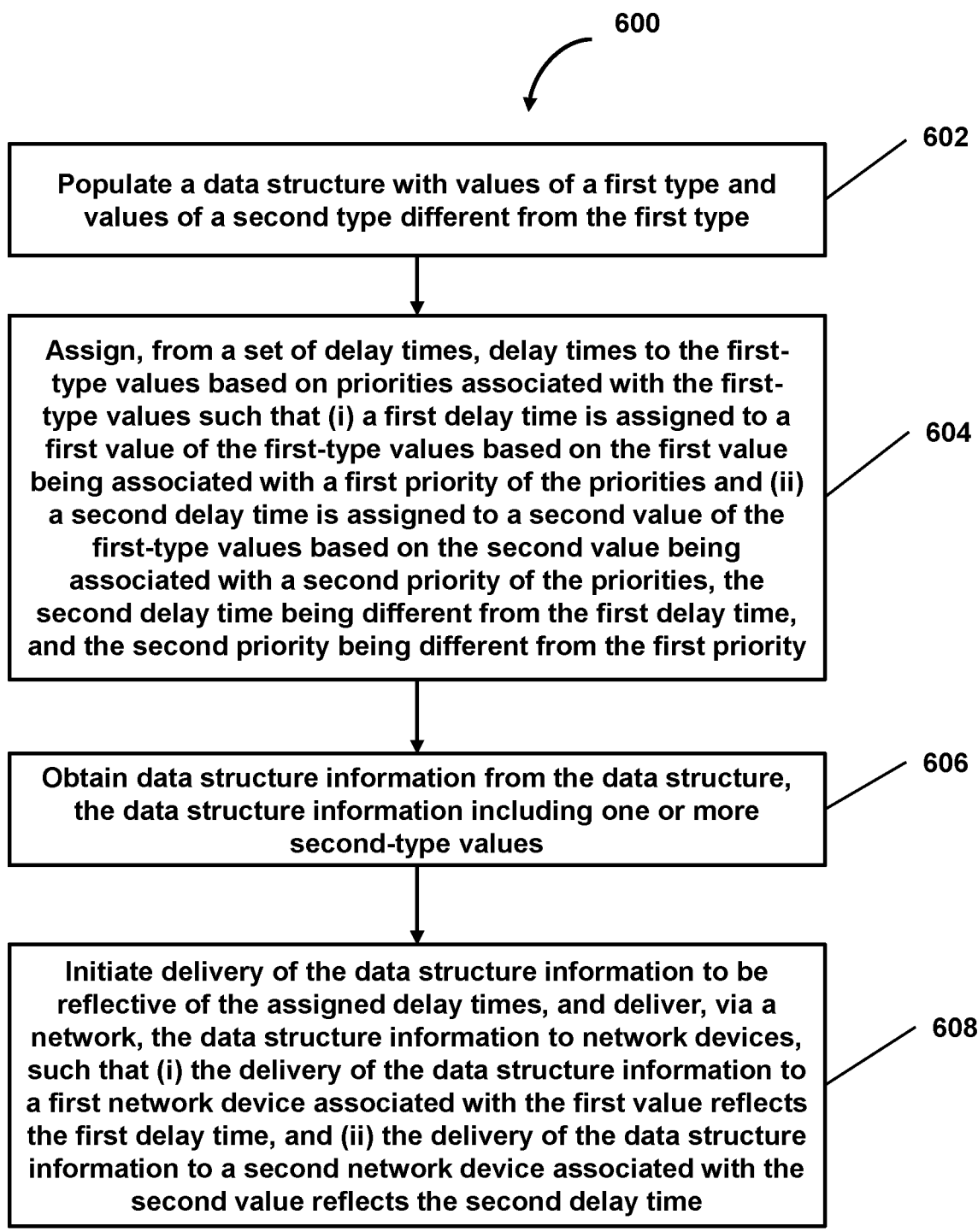
FIG. 6 illustrates a method of dynamically disseminating information to network devices via a network, in accordance with one or more embodiments.

FIG. 6 illustrates an example flowchart 600 describing a method of dynamically disseminating information to network devices via a network. In step 602, a data structure may be populated with values of a first type and values of a second type different from the first type. The values of the first type and the values of the second type may be obtained from one or more network devices. The data structure may be dynamically and continuously populated with new values of the first type and the second type and may be dynamically and continuously updated based on new values added to the data structure and/or old values removed from the data structure.

Further, in step 604, delay times (from a set of delay times) may be assigned to the first-type values based on priorities associated with the first-type values such that (i) a first delay time is assigned to a first value of the first-type values based on the first value being associated with a first priority of the priorities and (ii) a second delay time is assigned to a second value of the first-type values based on the second value being associated with a second priority of the priorities. Priorities may be associated with the first-type values based on, for example, a numerical value of the first-type values. For example, a lowest value of the first type among a plurality of values of the first type may be associated with (or assigned) the highest priority among a first set of priorities and the highest value of the first type among the plurality of values of the first type may be associated with (or assigned) the lowest priority among the first set of priorities. In other words, a higher value of the first type may be associated with (or assigned) a lower priority than a lower value of the first type. Alternatively, the lowest value of the first type among the plurality of values of the first type may be associated with (or assigned) the lowest priority among a first set of priorities and the highest value of the first type may be associated with (or assigned) the highest priority among the first set of priorities. In other words, a higher value of the first type may be associated with (or assigned) a higher priority than a lower value of the first type. Accordingly, in step 604, based on the above-noted priorities associated with the first-type values, the first-type values may be assigned delay times from a set of delay times, where a first delay time may be assigned to a first value of the first-type values based on the first value being associated with a first priority of the priorities and a second delay time may be assigned to a second value of the first-type values based on the second value being associated with a second priority of the priorities. The second delay time may be different from the first delay time and the second priority may be different from the first priority.

In step 606, data structure information may be obtained from the data structure, where the data structure information includes one or more second-type values. The data structure information may be a snapshot of the one or more second-type values. In step 608, delivery of the data structure information may be initiated. The initiation of the delivery of the data structure information may be reflective of the delay times assigned to the first-type values. Further, in step 608, the data structure information may be delivered to network devices such that (i) the delivery of the data structure information to a first network device associated with the first value reflects the first delay time and (ii) the delivery of the data structure information to a second network device associated with the second value reflects the second delay time. For example, the data structure information may be delivered to the first network device associated with the first value after a first delay time and the second data structure information may be delivered to the second network device associated with the second value after a second delay time. As the first delay time is different from the second delay time, the data structure information may be delivered to the first network device and the second network device at different times.

Figure 7:
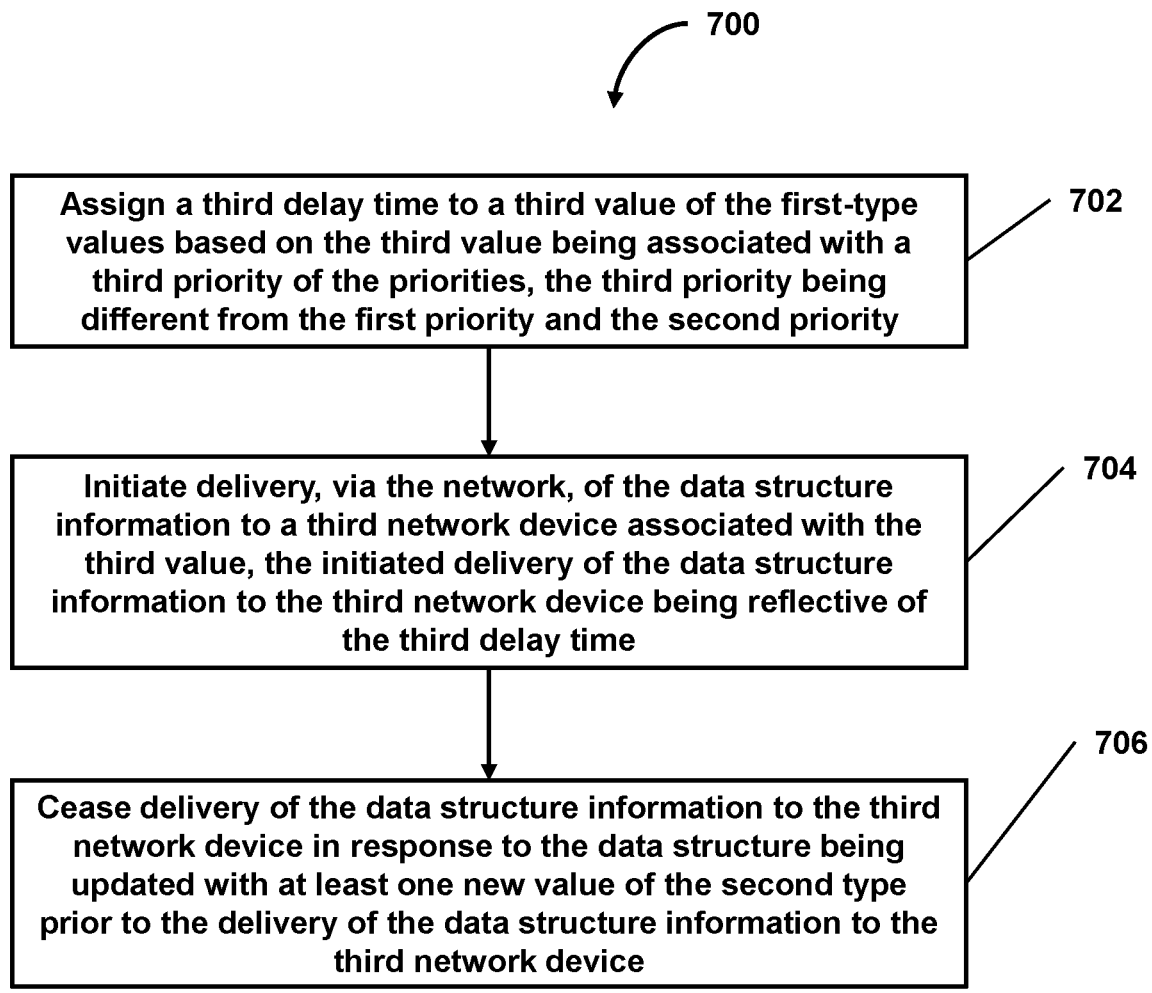
FIG. 7 illustrates a method of ceasing delivery of data structure information to a network device, in accordance with one or more embodiments.

FIG. 7 illustrates an example flowchart 700 describing a method of ceasing delivery of data structure information to a network device.

In step 702, a third delay time may be assigned to a third value of the first-type values based on the third value being associated with a third priority of the priorities. The third priority may be different from the first priority and the second priority described above with regard to FIG. 6 and the third delay time may be different from the first and second delay times described above with regard to FIG. 6. As noted above, priorities may be associated with the first-type values based on, for example, a numerical value of the first-type values. Accordingly, in step 702, based on the third priority associated with the third value, the third value of the first-type values may be assigned the third delay time from a set of delay times.

In step 704, delivery, via a network, of the data structure information to a third network device (which may be different from the first and second network devices described above with regard to FIG. 6) associated with the third value may be initiated. The initiated delivery of the data structure information to the third network device may be reflective of the third delay time. Further, in step 706, the delivery of the data structure information to the third network device may cease in response to the data structure being updated (for example, by adding at least one new value of a first or second type, by removing at least one value of a first or second type that was previously included in the data structure, or by adding any data to or removing any data from the data structures) prior to the delivery of the data structure information to the third network device. In other words, the data structure information may be prepared for delivery to the third network device based on the third delay time in step 704 and the delivery of the data structure information may be stopped (or halted) in response to the data structure being updated in step 706 prior to the delivery of the data structure information to the third network device. The steps in FIGS. 6 and 7 may be repeated based on the updated data structure.

Figure 8:
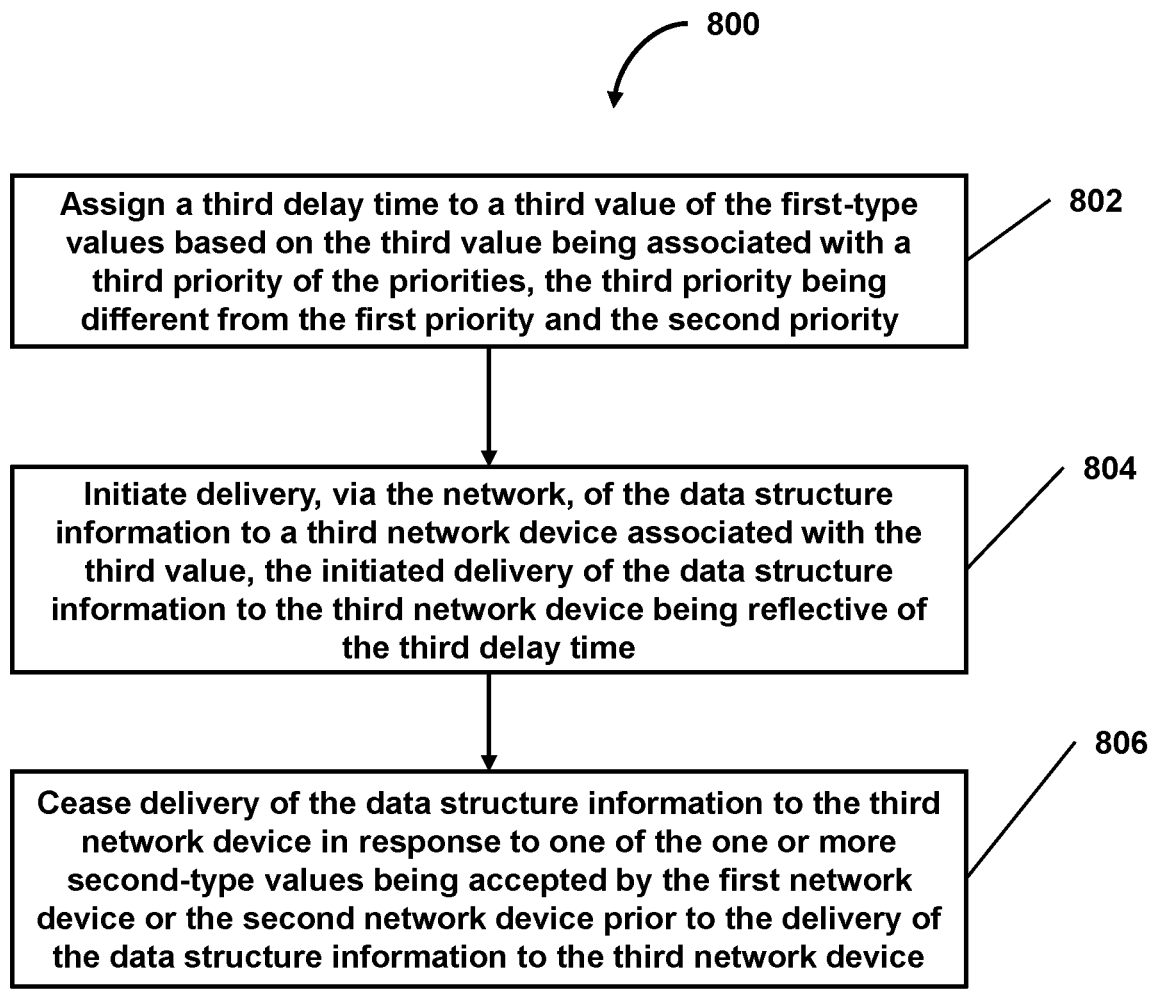
FIG. 8 illustrates another method of ceasing delivery of data structure information to a network device, in accordance with one or more embodiments.

FIG. 8 illustrates an example flowchart 800 describing another method of ceasing delivery of data structure information to a network device.

In step 802, a third delay time may be assigned to a third value of the first-type values based on the third value being associated with a third priority of the priorities. The third priority may be different from the first priority and the second priority described above with regard to FIG. 6 and the third delay time may be different from the first and second delay times described above with regard to FIG. 6. As noted above, priorities may be associated with the first-type values based on, for example, a numerical value of the first-type values. Accordingly, in step 802, based on the third priority associated with the third value, the third value of the first-type values may be assigned the third delay time from a set of delay times.

In step 804, delivery, via a network, of the data structure information to a third network device (which may be different from the first and second network devices described above with regard to FIG. 6) associated with the third value may be initiated. The initiated delivery of the data structure information to the third network device may be reflective of the third delay time. Further, in step 806, the delivery of the data structure information to the third network device may cease in response to one or more values (for example, one or more first-type values or one or more second-type values) being accepted by the first network device or the second network device (see description with regard to FIG. 6 with respect to the first network device and the second network device) prior to the delivery of the data structure information to the third network device. In other words, the data structure information may be prepared for delivery to the third network device based on the third delay time in step 804 and the delivery of the data structure information may be stopped (or halted) in response to one or more values being accepted in step 806 prior to the delivery of the data structure information to the third network device. Once the one or more values are accepted by a network device, the data structure may be updated by removing the one or more values from the data structure. In other words, based on the one or more values being accepted in step 806, the data structure may be updated and the steps in FIGS. 6 and 8 may be repeated based on the updated data structure.

Figure 9:
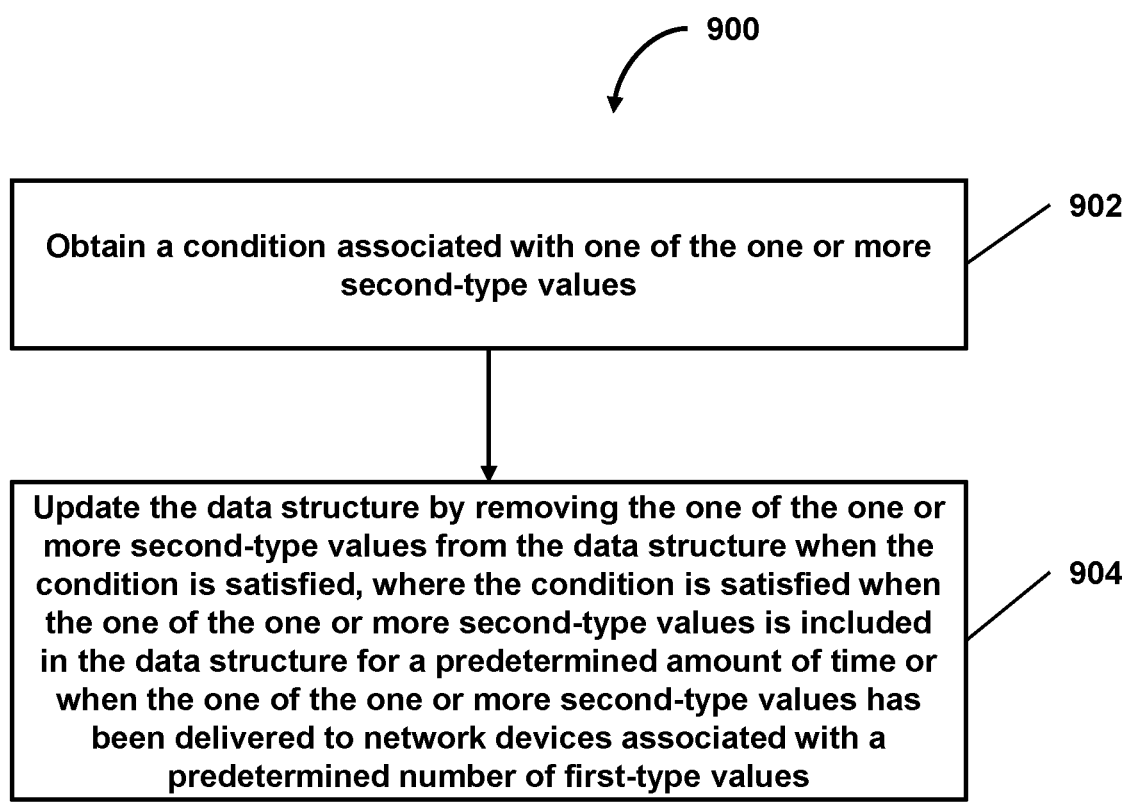
FIG. 9 illustrates a method of removing a value from a data structure when a condition is satisfied, in accordance with one or more embodiments.

FIG. 9 illustrates an example flowchart 900 describing a method of removing one or more values from the data structure when a condition is satisfied.

In step 902, a condition associated with a value (for example, one of the one or more first-type or second type values) may be obtained. The condition may relate to removing the value of from the data structure when the condition is satisfied. Further in step 904, the data structure may be updated by removing the value from the data structure when the condition is satisfied. The condition may be satisfied when the value is included in the data structure for a predetermined amount of time and the value may be automatically removed from the data structure after the predetermined amount of time has lapsed. Alternatively, or additionally, the condition may be satisfied when the value has been delivered to network devices associated with a predetermined number of values (for example, first-type values or second-type values) or with values associated with a predetermined number of priorities. Based on the updated data structure, the steps in FIGS. 6 and 9 may be repeated.

In some embodiments, the various computers and subsystems illustrated in FIG. 1 may include one or more computing devices that are programmed to perform the functions described herein. The computing devices may include one or more electronic storages (e.g., database(s) 132, which may include data analysis database(s) 134, delay time database(s) 136, etc., or other electric storages), one or more physical processors programmed with one or more computer program instructions, and/or other components. The computing devices may include communication lines or ports to enable the exchange of information with a network (e.g., network 150) or other computing platforms via wired or wireless techniques (e.g., Ethernet, fiber optics, coaxial cable, WiFi, Bluetooth, near field communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 112-116 or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 112-116 described herein is for illustrative purposes, and is not intended to be limiting, as any of subsystems 112-116 may provide more or less functionality than is described. For example, one or more of subsystems 112-116 may be eliminated, and some or all of its functionality may be provided by other ones of subsystems 112-116. As another example, additional subsystems may be programmed to perform some or all of the functionality attributed herein to one of subsystems 112-116.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment may be combined with one or more features of any other embodiment. Further, although the above operations have been described as being performed in a centralized manner, it should be understood that the above operations may be performed in a de-centralized manner, using blockchain technology for example.

The present techniques will be better understood with reference to the following enumerated embodiments:

1. A method comprising: populating a data structure with values of a first type and values of a second type different from the first type; assigning, from a set of delay times, delay times to the first-type values based on priorities associated with the first-type values such that (i) a first delay time is assigned to a first value of the first-type values based on the first value being associated with a first priority of the priorities and (ii) a second delay time is assigned to a second value of the first-type values based on the second value being associated with a second priority of the priorities, the second delay time being different from the first delay time, and the second priority being different from the first priority; obtaining data structure information from the data structure, the data structure information including one or more second-type values; and initiating delivery of the data structure information to be reflective of the assigned delay times, and delivering, via a network, the data structure information to network devices, such that (i) the delivery of the data structure information to a first network device associated with the first value reflects the first delay time, and (ii) the delivery of the data structure information to a second network device associated with the second value reflects the second delay time.

2. The method of embodiment 1, wherein the first priority is higher than the second priority, and the second delay time is greater than the first delay time.

3. The method of any of embodiments 1 and 2, further comprising: assigning a third delay time to a third value of the first-type values based on the third value being associated with a third priority of the priorities, the third priority being different from the first priority and the second priority; initiating delivery, via the network, of the data structure information to a third network device associated with the third value, the initiated delivery of the data structure information to the third network device being reflective of the third delay time; and ceasing delivery of the data structure information to the third network device in response to the data structure being updated with at least one new value of the second type prior to the delivery of the data structure information to the third network device.

4. The method of any of embodiments 1-3, further comprising: assigning a third delay time to a third value of the first-type values based on the third value being associated with a third priority of the priorities, the third priority being different from the first priority and the second priority; initiating delivery, via the network, of the data structure information to a third network device associated with the third value, the initiated delivery of the data structure information to the third network device being reflective of the third delay time; and ceasing delivery of the data structure information to the third network device in response to one of the one or more second-type values being accepted by the first network device or the second network device prior to the delivery of the data structure information to the third network device.

5. The method of any of embodiments 1-4, further comprising: updating the data structure by removing the one of the one or more second-type values and the first value or the second value of the first-type values from the data structure based on the one of the one or more second-type values being accepted by the first network device or the second network device.

6. The method of any of embodiments 1-5, further comprising: obtaining a condition associated with one of the one or more second-type values; and updating the data structure by removing the one of the one or more second-type values from the data structure when the condition is satisfied.

7. The method of embodiment 6, wherein the condition is satisfied when the one of the one or more second-type values is included in the data structure for a predetermined amount of time or when the one of the one or more second-type values has been delivered to network devices associated with a predetermined number of first-type values.

8. The method of any of embodiments 1-7, further comprising: obtaining a third value of the second-type values; updating the data structure information by adding the third value to the data structure; and initiating delivery of the updated data structure information to be reflective of the assigned delay times, and delivering, via the network, the updated data structure information to the network devices, such that (i) the delivery of the updated data structure information to the first network device associated with the first value reflects the first delay time, and (ii) the delivery of the updated data structure information to the second network device associated with the second value reflects the second delay time.

9. The method of any of embodiments 1-8, wherein the data structure information corresponds to a snapshot of the data structure.

10. The method of any of embodiments 1-9, wherein the data structure information corresponds to a snapshot of the data structure, and the updated data structure information corresponds to a change in the snapshot of the data structure.

11. A system, comprising: one or more processors; and memory storing instructions that when executed by the processors cause the processors to effectuate operations comprising those of any of embodiments 1-10.

12. A tangible, non-transitory, machine-readable medium storing instructions that when executed by a data processing apparatus cause the data processing apparatus to perform operations comprising those of any of embodiments 1-10.

What is claimed is:

1. A system for reducing resource usage via dynamic dissemination of information to network devices based on priority and acceptance monitoring, the system comprising:
   a server for an exchange or trading platform that comprises one or more processors programmed with computer program instructions that, when executed, cause the computer system to:
   obtain a first value of a first type from a first network device and a second value of the first type from a second network device, wherein the first type comprises an offer, or indication of interest, to buy or sell a first product on the exchange or trading platform, and wherein the first value and the second value comprise respective prices of the offer;
   dynamically and continuously populate a data structure with first-type values and second-type values, wherein the first-type values that are populated into the data structure include the first value and the second value, and wherein the data structure comprises an order book of products available for, or having indications of interest to, purchase or sale, on the exchange or trading platform;
   based on the first-type values populated in the data structure, dynamically and continuously, assign delay times to the first-type values based on priorities associated with the first-type values such that:
     (i) a first delay time is assigned to the first value of the first-type values based on the first value being associated with a first priority of the priorities,
     (ii) a second delay time is assigned to the second value of the first-type values based on the second value being associated with a second priority of the priorities, and
     (iii) a third delay time is assigned to a third value of the first-type values based on the third value being associated with a third priority of the priorities, each of the first, second, and third delay times being different from one another, and each of the first, second, and third priorities being different from one another; and
   initiate delivery of information included in the data structure to be reflective of the assigned delay times, and send, via a network, the information to network devices, such that (i) the information is sent, via the network, to the first network device associated with the first value after the first delay time, and (ii) the information is sent, via the network, to the second network device associated with the second value only after the second delay time, the second delay time being greater than the first delay time, wherein the first value of the first type and the second value of the first type are obtained from the first and second network devices, respectively, to perform the populating of the data structure, and wherein the information sent to the first network device after the first delay time and to the second network device after the second delay time includes the values of the first type and the values of the second type included in the data structure, wherein the information comprises a portion of the order book of products available for, or having indications of interest to, purchase or sale on the exchange or trading platform,
   wherein the one or more processors programmed with the computer program instructions further cause the server to:

continuously change the delay times assigned to the first-type values based on an update to the first-type values and the priorities associated with the updated first-type values;

cease initiation of delivery of the information to a third network device associated with the third value in response to a value of the second-type values, which is included in the information, being accepted by the first network device or the second network device such that the information is not sent to the third network device; and dynamically and continuously update the data structure, and deliver, via the network, updated information included in the updated data structure to one or more network devices such that the delivery of the updated information includes only a portion of the data structure that has been updated.

2. The system of claim 1, wherein the first priority is higher than the second priority.

3. The system of claim 1, wherein the server for the exchange or trading platform is caused to:

update the data structure by removing the value of the second-type values and the first value or the second value of the first-type values from the data structure based on the value of the second-type values being accepted by the first network device or the second network device.

4. The system of claim 1, wherein the server for the exchange or trading platform is caused to:

obtain a condition associated with one or more second-type values; and update the data structure by removing the one or more second-type values from the data structure when the condition is satisfied.

5. The system of claim 4, wherein the condition is satisfied when the one or more second-type values has been delivered to one or more network devices associated with a predetermined number of first-type values.

6. The system of claim 4, wherein the condition is satisfied when the one or more second-type values is included in the data structure for a predetermined amount of time.

7. The system of claim 1, wherein the information corresponds to a snapshot of the data structure.

8. The system of claim 1, wherein the first delay time is zero.

9. A method being implemented by a server for an exchange or trading platform system that comprises one or more processors executing computer program instructions that, when executed, perform the method, the method comprising:

obtaining a first value of a first type from a first network device and a second value of the first type from a second network device, wherein the first type comprises an offer, or indication of interest, to buy or sell a first product on the exchange or trading platform, and wherein the first value and the second value comprise respective prices of the offer;

dynamically and continuously populating a data structure with first-type values and second-type values, wherein the first-type values that are populated into the data structure include the first value and the second value, and wherein the data structure comprises an order book of products available for, or having indications of interest to, purchase or sale on the exchange or trading platform;

based on the first-type values populated in the data structure, dynamically and continuously, assigning delay times to the first-type values based on priorities associated with the first-type values such that:
  (i) a first delay time is assigned to the first value of the first-type values based on the first value being associated with a first priority of the priorities, and
  (ii) a second delay time is assigned to the second value of the first-type values based on the second value being associated with a second priority of the priorities, the second delay time being different from the first delay time, and the second priority being different from the first priority;

initiating delivery of information included in the data structure to be reflective of the assigned delay times, and sending, via a network, the information to network devices, such that (i) the information is sent, via the network, to the first network device associated with the first value after the first delay time, and (ii) the information is sent, via the network, to the second network device associated with the second value only after the second delay time, the second delay time being greater than the first delay time, wherein the first value of the first type and the second value of the first type are obtained from the first and second network devices, respectively, to perform the populating of the data structure, and wherein the information sent to the first network device after the first delay time and to the second network device after the second delay time includes the values of the first type and the values of the second type included in the data structure, wherein the information comprises a portion of the order book of products available for, or having indications of interest to, purchase or sale on the exchange or trading platform;

continuously changing the delay times assigned to the first-type values based on an update to the first-type values and the priorities associated with the updated first-type values; and dynamically and continuously updating the data structure, and delivering, via the network, updated information included in the updated data structure to one or more network devices such that the delivery of the updated information includes only a portion of the data structure that has been updated.

10. The method of claim 9, wherein the first priority is higher than the second priority.

11. The method of claim 9, further comprising:

assigning a third delay time to a third value of the first-type values based on the third value being associated with a third priority of the priorities, the third priority being different from the first priority and the second priority;

initiating delivery, via the network, of the information included in the data structure to a third network device associated with the third value, the initiated delivery of the information to the third network device being reflective of the third delay time; and ceasing the initiation of delivery of the information to the third network device in response to the data structure being updated with at least one new value of the second type such that the information is not sent to the third network device.

12. The method of claim 9, further comprising:

assigning a third delay time to a third value of the first-type values based on the third value being associated with a third priority of the priorities, the third priority being different from the first priority and the second priority;

initiating delivery, via the network, of the information included in the data structure to a third network device associated with the third value, the initiated delivery of the information to the third network device being reflective of the third delay time; and ceasing the initiation of delivery of the information to the third network device in response to a value of the second-type values, which is included in the information, being accepted by the first network device or the second network device such that the information is not sent to the third network device.

13. The method of claim 12, further comprising:
updating the data structure by removing the value of the second-type values and the first value or the second value of the first-type values from the data structure based on the value of the second-type values being accepted by the first network device or the second network device.

14. The method of claim 9, further comprising:
obtaining a condition associated with one or more second-type values; and
updating the data structure by removing the one or more second-type values from the data structure when the condition is satisfied.

15. The method of claim 14, wherein the condition is satisfied when the one or more second-type values has been delivered to one or more network devices associated with a predetermined number of first-type values.

16. The method of claim 14, wherein the condition is satisfied when the one or more second-type values is included in the data structure for a predetermined amount of time.

17. The method of claim 9, further comprising:
obtaining a third value of the second-type values;
updating the information by adding the third value to the data structure; and
initiating delivery of the updated information to be reflective of the assigned delay times, and sending, via the network, the updated information to the network devices, such that (i) the updated information is sent to the first network device associated with the first value after the first delay time, and (ii) the updated information is sent to the second network device associated with the second value only after the second delay time.

18. The method of claim 17, wherein the information corresponds to a snapshot of the data structure, and the updated information corresponds to a change in the snapshot of the data structure.

19. The method of claim 9, wherein the information corresponds to a snapshot of the data structure.

20. The method of claim 9, wherein the first delay time is zero.

21. One or more non-transitory computer readable media storing computer program instructions that, when executed by a server for an exchange or trading platform, cause a computer system to perform operations comprising:
obtaining a first value of a first type from a first network device and a second value of the first type from a second network device, wherein the first type comprises an offer, or indication of interest, to buy or sell a first product on the exchange or trading platform, and wherein the first value and second value comprise respective prices of the offer;

dynamically and continuously populating a data structure with first-type values and second-type values, wherein the first-type values that are populated into the data structure include the first value and the second value, and wherein the data structure comprises an order book of products available for, or having indications of interest to, purchase or sale on the exchange or trading platform;

based on the first-type values populated in the data structure, dynamically and continuously, assigning delay times to the first-type values based on priorities associated with the first-type values such that:
(i) a first delay time is assigned to the first value of the first-type values based on the first value being associated with a first priority of the priorities, and
(ii) a second delay time is assigned to the second value of the first-type values based on the second value being associated with a second priority of the priorities, the second delay time being different from the first delay time, and the second priority being different from the first priority;

initiating delivery of information included in the data structure to be reflective of the assigned delay times, and sending, via a network, the information to network devices, such that (i) the information is sent, via the network, to the first network device associated with the first value after the first delay time, and (ii) the information is sent, via the network, to the second network device associated with the second value only after the second delay time, the second delay time being greater than the first delay time, wherein the first value of the first type and the second value of the first type are obtained from the first and second network devices, respectively, to perform the populating of the data structure, and wherein the information sent to the first network device after the first delay time and to the second network device after the second delay time includes the values of the first type and the values of the second type included in the data structure, wherein the information comprises a portion of the order book of products available for, or having indications of interest to, purchase or sale on the exchange or trading platform;

continuously changing the delay times assigned to the first-type values based on an update to the first-type values and the priorities associated with the updated first-type values; and dynamically and continuously updating the data structure, and delivering, via the network, updated information included in the updated data structure to one or more network devices such that the delivery of the updated information includes only a portion of the data structure that has been updated.

22. The one or more non-transitory computer readable media of claim 21, wherein the first priority is higher than the second priority.

23. The one or more non-transitory computer readable media of claim 21, the operations further comprising:
assigning a third delay time to a third value of the first-type values based on the third value being associated with a third priority of the priorities, the third priority being different from the first priority and the second priority;

initiating delivery, via the network, of the information included in the data structure to a third network device associated with the third value, the initiated delivery of the information to the third network device being reflective of the third delay time; and ceasing the initiation of delivery of the information to the third network device in response to the data structure being updated with at least one new value of the second type such that the information is not sent to the third network device.

24. The one or more non-transitory computer readable media of claim 21, the operations further comprising:

assigning a third delay time to a third value of the first-type values based on the third value being associated with a third priority of the priorities, the third priority being different from the first priority and the second priority;

initiating delivery, via the network, of the information included in the data structure to a third network device associated with the third value, the initiated delivery of the information to the third network device being reflective of the third delay time; and ceasing the initiation of delivery of the information to the third network device in response to a value of the second-type values, which is included in the information, being accepted by the first network device or the second network device such that the information is not sent to the third network device.

* * * * *